US008702882B2

(12) United States Patent
Cai et al.

(10) Patent No.: US 8,702,882 B2
(45) Date of Patent: Apr. 22, 2014

(54) METHOD AND SYSTEM FOR ONLINE QUALITY MONITORING AND CONTROL OF A VIBRATION WELDING PROCESS

(75) Inventors: Wayne W. Cai, Troy, MI (US); Jeffrey A Abell, Rochester Hills, MI (US); Jason C. H. Tang, Sterling Heights, MI (US); Michael Anthony Wincek, Rochester, MI (US); Paul J Boor, Macomb, MI (US); Paul F. Spacher, Rochester, NY (US); Shixin Jack Hu, Ann Arbor, MI (US)

(73) Assignees: GM Global Technology Operations LLC, Detroit, MI (US); The Regents of University of Michigan, Ann Arbor, MI (US)

( * ) Notice: Subject to any disclaimer, the term of this patent is extended or adjusted under 35 U.S.C. 154(b) by 156 days.

(21) Appl. No.: 12/898,075

(22) Filed: Oct. 5, 2010

(65) Prior Publication Data

US 2011/0108181 A1 May 12, 2011

Related U.S. Application Data

(60) Provisional application No. 61/259,267, filed on Nov. 9, 2009.

(51) Int. Cl.
*B32B 41/00* (2006.01)

(52) U.S. Cl.
USPC .......... 156/64; 156/73.1; 156/73.4; 156/73.5; 156/73.6; 156/351; 156/359; 156/367; 156/580.1

(58) Field of Classification Search
USPC .............. 156/64, 73.1, 73.4, 73.5, 73.6, 351, 156/378, 359, 367, 580.1, 580.2, 581, 156/583.91

See application file for complete search history.

(56) References Cited

U.S. PATENT DOCUMENTS

| 4,529,115 | A | * | 7/1985 | Renshaw et al. | 228/1.1 |
| 4,587,183 | A | * | 5/1986 | McCartney, Jr. | 429/176 |
| 7,516,022 | B2 | * | 4/2009 | Lee et al. | 702/39 |
| 2002/0108719 | A1 | * | 8/2002 | Cullins et al. | 156/583.91 |
| 2003/0168162 | A1 | * | 9/2003 | Eile et al. | 156/289 |
| 2003/0232239 | A1 | * | 12/2003 | Gow et al. | 429/120 |
| 2005/0257087 | A1 | | 11/2005 | Goff | |
| 2007/0257086 | A1 | * | 11/2007 | Schroeder | 228/101 |
| 2007/0257087 | A1 | * | 11/2007 | Klinstein et al. | 228/101 |
| 2010/0280646 | A1 | * | 11/2010 | Hesse et al. | 700/110 |

FOREIGN PATENT DOCUMENTS

JP 07290346 A * 11/1995
WO WO 2009062887 A1 * 5/2009

* cited by examiner

*Primary Examiner* — George Koch
(74) *Attorney, Agent, or Firm* — Quinn Law Group, PLLC

(57) ABSTRACT

A method for monitoring and controlling a vibration welding system includes collecting sensory data during formation of a welded joint using sensors positioned with respect to welding interfaces of a work piece. A host machine extracts a feature set from a welding signature collectively defined by the sensory data, compares and correlates the feature set with validated information in a library, and executes a control action(s) when the present feature set insufficiently matches the information. A welding system includes a sonotrode, sensors, and the host machine. The host machine is configured to execute the method noted above.

11 Claims, 3 Drawing Sheets

METHOD AND SYSTEM FOR ONLINE QUALITY MONITORING AND CONTROL OF A VIBRATION WELDING PROCESS

CROSS REFERENCE TO RELATED APPLICATIONS

This application claims priority to and the benefit of U.S. Provisional Patent Application No. 61/259,267, filed Nov. 9, 2009, which is hereby incorporated by reference in its entirety.

TECHNICAL FIELD

The invention relates generally to the process of vibration welding, and in particular to a method and an apparatus for non-destructive, online quality monitoring and control of a vibration metal welding process.

BACKGROUND

The process of vibration welding utilizes controlled oscillations or vibrations in a particular range of frequencies and directions in order to join adjacent plastic or metal work pieces. Ultrasonic welding and other vibration welding processes involve moving work pieces under pressure while transmitting vibrations through the work pieces, thus creating surface friction. The surface friction ultimately generates heat and softens adjacent portions of the work pieces, ultimately joining the work pieces.

In a vibration welding system, a weld horn or sonotrode is directly connected to or formed integrally with one or more welding heads. The welding head(s) may include one or more textured welding tips or knurls, i.e., the surfaces that physically contact the work pieces as they are being welded. The work pieces are supported by a stationary welding anvil. Vibration welding has tremendous utility in industry, for example in the joining of various onboard components during the manufacturing of a vehicle. The efficiency, consistency, and reliability/durability of a vibration-welded part, including but not limited to a multi-cell vehicle battery, depends largely on the methodology and the design of the welding tools used to form the various spot welds or welded joints in the finished part.

SUMMARY

Accordingly, an optimized vibration welding method and system are provided herein. Real-time, non-destructive quality monitoring and control during ultrasonic metal welding and other vibration welding processes are provided via the present method, which may be embodied as an algorithm or a set of instructions recorded on a tangible, computer-executable medium and automatically executed by a host machine as described herein. Various measurements are taken during the formation of a vibration welded joint, e.g., a weld spot, multiple weld spots, a welded seam, etc., with the measurements collectively defining a weld signature. Feature sets are then extracted from the weld signature to determine, in real-time/online during the active formation of a welded joint, whether the welded joint is acceptable.

The present method includes collecting a set of sensory data from control signals and/or sensors, e.g., temperature, acoustic, electrical, mechanical, or other suitable sensors positioned with respect to the welding interface or in close proximity to the welded joint, during active formation of the welded joint. These values collectively define the weld signature. In one possible embodiment, a sheathed or insulated thermocouple may be embedded within a stationary portion of a welding system, such as within a wall of the anvil. One thermocouple may be provided for each weld spot being formed, e.g., three thermocouples for a battery tab requiring three weld spots. In another embodiment, acoustic sensors or electrical sensors may be used to measure other welding parameters that can be used to define the overall weld signature.

For example, the anvil may define a plurality of holes or bores into which a thermocouple or other sensor can be inserted in close proximity to the welding interface, such that precise sensory measurements can be obtained from within the welding system. Alternately, the anvil may be segmented, with the sensors inserted and bonded between adjacent segments of the anvil, and with the segments rejoined to form a solid anvil. Measurements from the sensors may be fed to the host machine to define the weld signature, and feature sets can be extracted from the signature to determine or predict the quality of the welded joint as it is being formed.

In another embodiment, welding control parameters or other internal control variables may be automatically modified during formation of a welded joint to change, in real-time, the final quality of the welded joint. For example, if a temperature at the locus of the welded joint is determined to drop below a calibrated threshold, the host machine may signal a welding controller/power supply to automatically change certain welding parameters, e.g., a mechanical oscillation and/or clamping force, to ensure weld quality. The clamping force applied to the work pieces during formation of the weld spot may be provided via a servo device, e.g., via an electric motor having nearly instant torque availability, in order to further optimize the monitoring and control response within the welding system.

Predictive value of the temperature measurements may be further enhanced using one or more additional measurements. Various measurements are possible within the intended scope of the invention, such as displacement of a weld head and/or indentation depth formed in a work piece during formation of the weld spot, dynamic resistance as measured between the sonotrode and the anvil, an applied clamping force, load cell measurements, acoustic values, thermography measurements, laser shearography and other optical and/or interferometric measurements, etc.

Collectively, these measurements may be considered to be a unique weld signature for each weld joint spot, with the weld signature being correlated with a pre-populated library of validated weld signatures to predict the quality of the resultant weld joint. Signatures of additional passing or good welds may be added to the library for use in future predictions. Neural networks, weighted formulae, predictive algorithms, linear regression analysis, principal component analysis, optimization schemes, statistical measurement and classification schemes, and/or other suitable techniques may be used by the host machine to extract the feature set from the weld signature, and ultimately predict the quality of the weld joint while it is being formed.

In particular, a method is provided herein for controlling an ultrasonic welding or other vibration welding system. The vibration welding system produces a welded joint or weld spot at or along a welding interface of the work piece using high-frequency mechanical vibrations or oscillations. The method includes collecting a set of sensory data, i.e., data generated by the welding controller or power supply during formation of the weld spot(s) and/or data from within the welding system, e.g., within a stationary welding anvil, using a plurality of sensors positioned with respect to the welding interface.

In one possible embodiment, at least one of the sensors can be configured as a thermocouple, acoustic, or other sensor and at least partially enclosed within a wall of the anvil, for example in a bore or positioned between segments of the anvil. A host machine can extract a present feature set from the weld signature, and compare and correlate the present feature set with validated feature sets contained in a library. A control action is then executed by the host machine when the present feature set insufficiently matches a validated feature set from the library.

A vibration welding system is also provided herein having a welding power supply and a sonotrode suitable for forming a welded joint, e.g., one or more weld spots, in work pieces using high-frequency vibrations or oscillations. The system includes a host machine configured for executing the method as set forth above.

The above features and advantages and other features and advantages of the present invention are readily apparent from the following detailed description of the best modes for carrying out the invention when taken in connection with the accompanying drawings.

DETAILED DESCRIPTION

Figure 1:
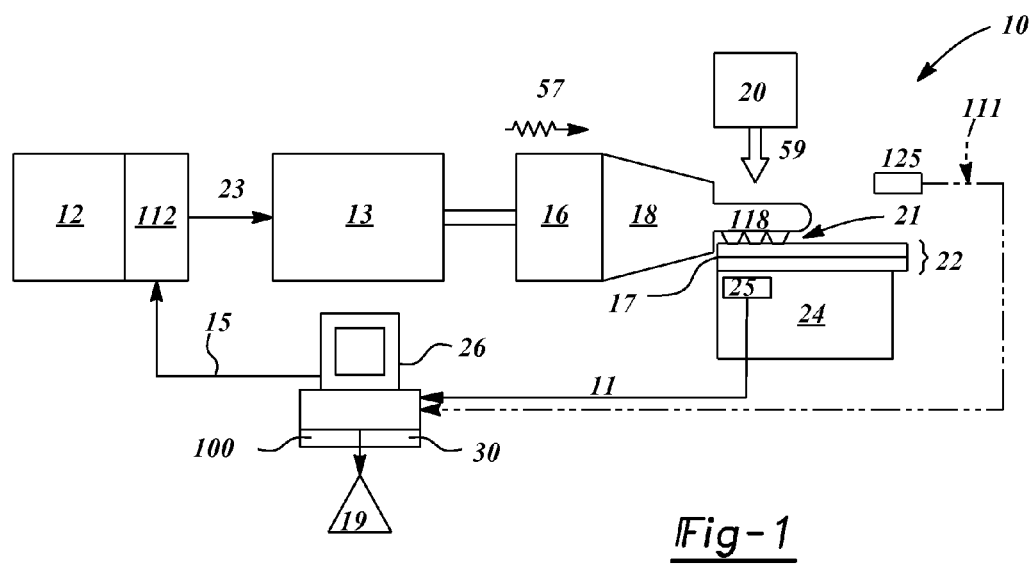
FIG. 1 is a schematic side view illustration of a vibration welding system in accordance with the invention.

Referring to the drawings, wherein like reference numbers refer to like components, and beginning with FIG. 1, a vibration welding system 10 is shown that is configured for forming welded joints using vibration energy in the ultrasonic frequency range, or in another suitable frequency range. The welding system 10 includes a welding power supply 12 that transforms an available source power into a form that is conducive to vibration welding. As understood by those of ordinary skill in the art, a power supply used in a vibration welding process, such as the power supply 12, can be electrically-connected to any suitable energy source, e.g., a 50-60 Hz wall socket. The power supply 12 may include a welding controller 112, which is usually but not necessarily integral with the power supply.

The power supply 12 and the welding controller 112 ultimately transform source power into a suitable power control signal (arrow 23) having a predetermined waveform characteristic(s) suited for use in the vibration welding process, for example a frequency of several hertz (Hz) to approximately 40 KHz, or much higher frequencies depending on the particular application.

The power control signal (arrow 23) is transmitted from the power supply 12, or more precisely from the welding controller 112, to a converter 13 having the required mechanical structure for producing a mechanical vibration or oscillation signal (arrow 57) in one or more welding heads 118. The welding head 118 may be integrally-formed with or connected to a welding horn or sonotrode (S) 18, with the mechanical oscillation signal (arrow 57) generated in response to the control signal (arrow 23). The mechanical oscillation signal (arrow 57) may be described by the various waveform characteristics thereof in terms of both the direction of oscillation and the amplitude and frequency/wavelength. As used herein, the power control signal (arrow 23) and the mechanical oscillation signal (arrow 57) are considered to be internal control signals, i.e., signals that are generated by and internal to the system 10 shown in FIG. 1.

The vibration welding system 10 of FIG. 1 may also include a booster 16 adapted for amplifying the amplitude of vibration, and/or for changing the direction of an applied clamping force (arrow 59) as described below. That is, the mechanical oscillation signal (arrow 57) may initially have a relatively low amplitude, e.g., a fraction of a micron up to a few millimeters, which can then be amplified via the booster 16 to produce the required mechanical oscillation. The mechanical oscillation signal (arrow 57) is in turn transmitted to the one or more weld heads 118 of the sonotrode 18.

The weld head 118 is the actual vibrating or oscillating device in welding system 10 that is used to form a vibration-welded joint in conjunction with an applied clamping force (arrow 59). The clamping force (arrow 59) may be applied by an external mechanism, which in the embodiment of FIG. 1 is configured as a servo device 20, e.g., an electric motor or any other servo-controlled device having a rapid response time. A welded joint is formed in proximity to a welding interface 17 between each of a plurality of work pieces 22. The system 10 may be used to weld or join metals or thermoplastics, as is well understood in the art, by varying the orientation of the vibrations emitted by the sonotrode 18. That is, for thermoplastics the vibrations emitted by the sonotrode 18 tend to be perpendicular to the surface being welded, while for metals the direction may be generally tangential thereto.

Still referring to FIG. 1, each weld head 118 may be directly attached to or formed integrally with one or more welding tips 21, i.e., the surface of the weld head actually contacting the surfaces of work pieces 22 during formation of the vibration-welded joint at or along the welding interface 17, which may be comprised of one or multiple interfaces depending on the nature of the work pieces. The welding tips 21 may be textured or configured to include knurls, teeth, and/or other frictional patterns or features to provide a sufficient grip on the work pieces 22. The work pieces 22 can be a multi-layer stack up, i.e., with a plurality of layers having a number that is not intended to be limited to the number shown in FIG. 2. To further facilitate the vibration welding process, one or more of the work pieces 22 may be positioned on a stationary surface or a welding anvil 24. While not shown in FIG. 1 for simplicity, the anvil 24 may also include similar knurls, teeth, and/or other frictional patterns or features to provide a sufficient grip on the work pieces 22, as is well understood in the art.

Within the scope of the present invention, sensors 25 positioned with respect to the welding interface 17 measure, sense, or otherwise collect a set of external sensory data 11, with the sensory data being transmitted to a host machine 26. The host machine 26 has access to a library 30 of previously-validated welding signatures and/or feature sets thereof, and is adapted for executing the method 100 that is described below with reference to FIG. 6 to evaluate the quality of the present weld in real time. While the host machine 26 is shown separately from the welding controller 112 in FIG. 1 for clarity, the host machine and the welding controller may be integrated into a single device, or the various elements may be distributed across a variety of different devices, without departing from the intended inventive scope.

Still referring to FIG. 1, the host machine 26 extracts selected feature sets from the welding signature formed from the sensory data 11, and compares and correlates the extracted feature sets with the validated library 30. Thereafter, the host machine 26 can execute one or more control actions, e.g., activating an indicator device 19 or modifying various control parameters in an open loop or a closed loop manner via control signals 15 as needed, as explained below with reference to FIG. 5.

The library 30 is a collection of validated total weld signatures and/or extracted feature sets thereof, e.g., various pairings or groupings of selected welding parameters that define a portion of a total weld signature. Data in the library 30 may be collected during the formation of a set of sample welds that are later tested as part of a validation process, e.g., via offline resistance measurements and/or tensile strength testing of the spot welds in a population of sample or test welds. The library 30 may be resident within memory of the host machine 26, or made readily accessible by the host machine as needed.

Host machine 26 may be configured as a digital computer having a microprocessor or central processing unit, read only memory (ROM), random access memory (RAM), electrically-erasable programmable read only memory (EEPROM), high speed clock, analog-to-digital (A/D) and digital-to-analog (D/A) circuitry, and input/output circuitry and devices (I/O), as well as appropriate signal conditioning and buffer circuitry. Any algorithms resident in the host machine 26 or accessible thereby, including any instructions or code embodying the method 100 as described below with reference to FIG. 5, can be stored on a tangible, computer-readable medium and automatically executed to provide the required functionality.

Still referring to FIG. 1, the sensors 25 are positioned in close proximity to the welding interface 17, i.e., at a critical spot(s) at or near the weld spot or welded joint being formed, to accurately measure the sensory data 11. In one embodiment, the sensors 25 may include thermocouple sensors adapted to measure temperature readings as part of sensory data 11. A particular configuration for this embodiment is shown in FIG. 2 and explained below.

Additional sensors 125 may be positioned with respect to the interface 17 to collect similar sensory data 111, with the actual position depending on the particular function and structure of the sensors. Such sensors 125 may include sensors adapted to measure dynamic resistance, e.g., between the sonotrode 18 or weld heads 118 and the work piece 22 during formation of the weld joint, and/or sensors which measure a displacement of the sonotrode and/or the weld heads during formation of the weld joint, e.g., linear variable differential transformer (LVDT)-based sensors of the type known in the art.

Sensors 125 may also include, without being limited to, load cells, lasers, acoustic sensors, acoustic emission sensors, thermal imaging cameras, etc. The various sensors 25, 125 used with the welding system 10 of FIG. 1 may vary without departing from the intended scope of the invention, with the collective set of sensory data 11, 111 relayed to the host machine 26. The host machine 26, by executing the present method 100, automatically compares and correlates feature sets from any weld signatures constructed using the sensory data 11, 111 and using any internal control data as needed, e.g., the power control signal (arrow 23) and the mechanical oscillation signal (arrow 57), to monitor and/or control the welding system 10 in real time. More precisely, the welds formed using the welding system 10 can be automatically monitored during their active formation, and without having to move the work pieces 22 to a different monitoring station.

Figure 2:
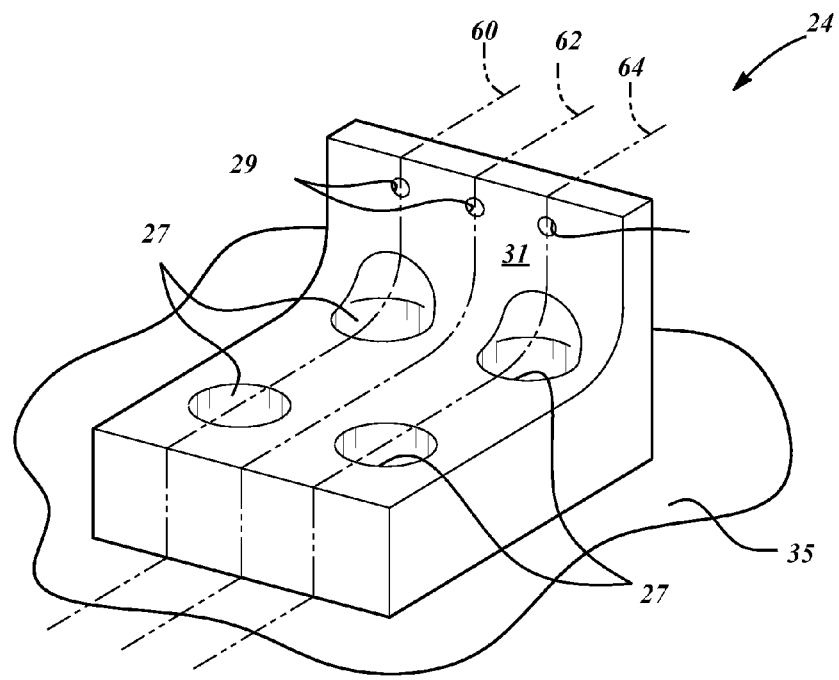
FIG. 2 is a schematic perspective illustration of a welding anvil adapted for use within the vibration welding system shown in FIG. 1.

Referring to FIG. 2, in one possible embodiment the anvil 24 of FIG. 1 may be specially adapted for use with one or more of the sensors 25 described above. For example, the anvil 24 may define holes or bores 29 in a solid wall 31 of the anvil. Bolt holes 27 may also be provided in the anvil 24 to receive a set of fasteners (not shown), and to thus secure the anvil to a stationary surface 35 such that the anvil remains stationary during the vibration welding process. Sensors 25 may be inserted into the bores 29 in close proximity to the welding interface 17 shown in FIG. 1. Such positioning may be particularly useful when the sensors 25 are configured as thermocouples adapted for directly measuring temperature at interface 17 as part of the sensory data 11.

In another embodiment, the anvil 24 may be segmented, as generally indicated by lines 60, 62, and 64. Thermocouples or any of the other sensors noted above may be inserted between adjacent segments, bonded in place, and the segments bonded or clamped to form the anvil 24. Such an option might help to alleviate the difficulty of precisely positioning the sensors 25 within the bores 29 with respect to the work pieces 22 and interface 17.

One sensor 25 may be provided for every weld spot or welded joint being formed. In the illustrative embodiment of FIG. 2, the anvil 24 includes three bores 29 adapted for receiving three sensors, i.e., the sensor 25 of FIG. 1, such that the sensors are embedded within the wall 31 of the anvil. However, those of ordinary skill in the art will recognize that other positions are possible, as well as other sensor types, without departing from the intended scope of the invention. For example, sensors 125 may include a thermal camera positioned near the interface 17, but external to the anvil 24. Actual position and distance of a given sensor 25, 125 from the interface 17 may be expected to vary depending on the design and insulation properties of the given sensor.

Figure 3:
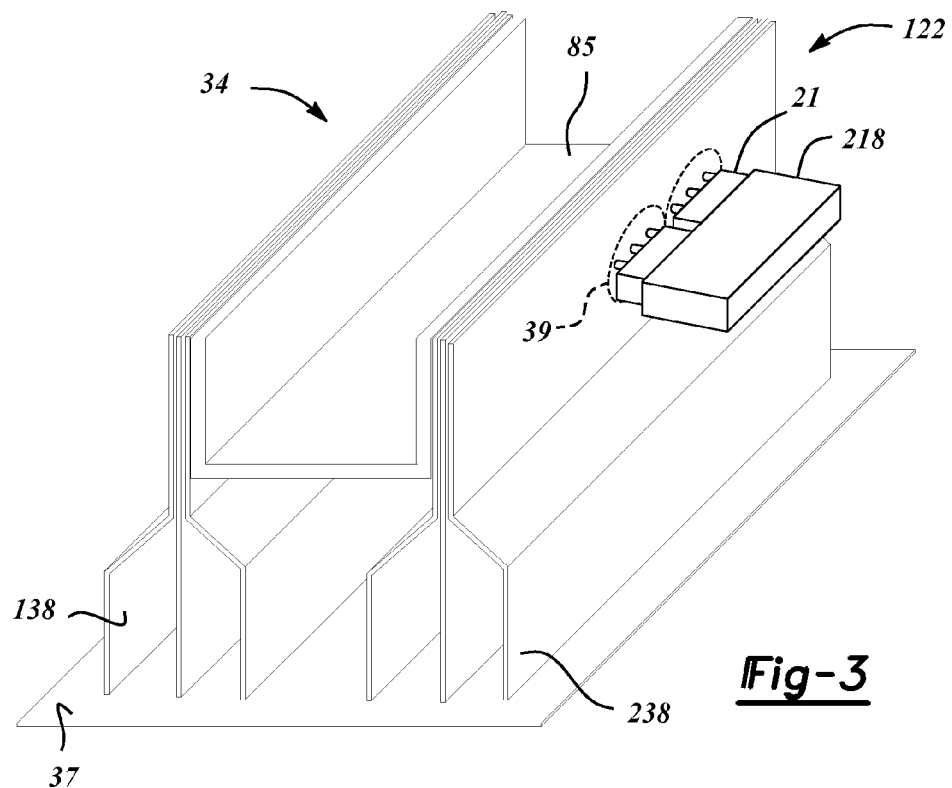
FIG. 3 is a schematic perspective illustration of a multi-cell battery module that may be vibration-welded using the system shown in FIG. 1.

Referring to FIG. 3, according to yet another embodiment a weld head 218 may be used to form weld spots that weld together work pieces 122 embodied as an electrical component, here represented as a multi-cell battery 34, although other electrical components may also be used within the scope of the present invention. The battery 34 includes a set of conductive tabs 138, 238 and an elongated interconnecting member 85. The sonotrode 18 and the remaining portions of the welding system 10 of FIG. 1 are omitted for clarity. The interconnecting member 85 may be constructed of a suitable conductive material, and may be shaped, sized, and/or otherwise configured to form a rail or bus bar, and mounted to an interconnect board (not shown) of the battery 34. For simplicity, only the portions of the battery 34 extending above an imaginary plane 37 are shown in FIG. 3.

Potential uses for the battery 34 include but are not limited to the powering of various onboard electronic devices and propulsion in a hybrid electric vehicle (HEV), an electric vehicle (EV), a plug-in hybrid electric vehicle (PHEV), and the like. By way of example, the battery 34 could be sufficiently sized to provide the necessary voltage for powering an electric vehicle or a hybrid gasoline/electric vehicle, e.g., approximately 300 to 400 volts or another voltage range, depending on the required application.

The battery 34 may include a plurality of battery cells each having a positively-charged terminal or tab 238 and a negatively-charged terminal or tab 138. The particular tabs 238, 138 that are positively and negatively-charged may be reversed from the configuration shown in FIG. 3 without departing from the intended scope of the invention, i.e., with tabs 238 being negatively-charged and tabs 138 being positively-charged. Whatever their respective charges, the tabs 138, 238 are electrode extensions of a cell, and are each internally-welded to the various anodes and cathodes comprising that particular cell, as will be well understood by those of ordinary skill in the art.

Figure 4:
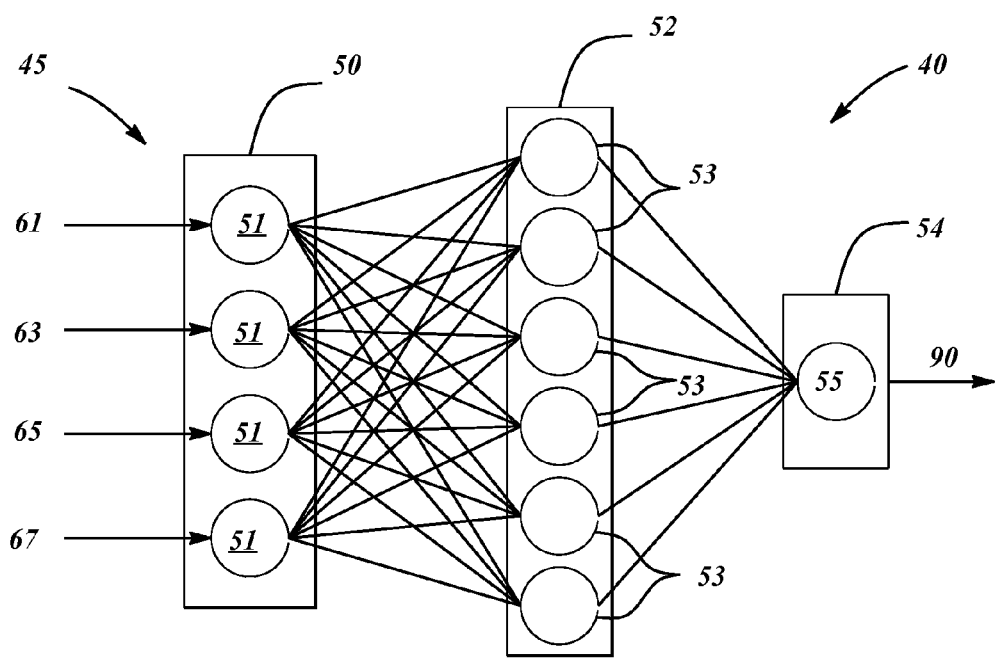
FIG. 4 is a schematic illustration of a neural network that may be used to monitor and control weld quality in the system of FIG. 1.

Referring to FIG. 4, the host machine 26 shown in FIG. 1, in executing the method 100 to monitor a weld joint and/or control the welding system 10 during a vibration welding process, automatically builds a total welding signature using the sensory data 11, 111 and extracts selected feature sets from the weld signature. As noted above, the total weld signature is constructed from a plurality of different welding parameters. The host machine 26 then compares and correlates the extracted feature sets with any available and relevant internal control data, e.g., power control signal (arrow 23 of FIG. 1) and oscillation signal (arrow 57 of the same Figure), to the library 30. In one embodiment, such feature set extraction and correlation may utilize calculation methods such as finite element analysis, differential equations, regression analysis, weighted algorithms, neural networks, principal component analysis, optimization algorithms, statistical measurement and classification systems, etc.

The neural network embodiment is illustrated in FIG. 4. A neural network provides an information processing paradigm. The neural network 40 may look, in real-time, at a predetermined total or combined set of detectable or measurable welding process variables, including the sensory data 11, 111 noted above. Neural network 40 may then determine or recognize whether a particular pattern is represented in the total welding signature collectively defined by the sensory data 11 and 111, or in an extracted feature set of such a weld signature, that is (1) acceptable, good, or passing, or (2) unacceptable, bad, or failing, according to a predetermined set of quality criteria.

As will be understood by those of ordinary skill in the art, neural networks such as the neural network 40 shown in FIG. 4 may be used to predict a particular result and/or to recognize a pattern that is presented by less than optimal, imprecise, and/or a relatively complex set of input data. For example, such input data may consist of sensory signals 11 and/or 111 described above, as well as any internal signals such as welding voltage and/or current values from the power supply 12 of FIG. 1, clamping force (arrow 39), environmental temperature, etc.

The neural network 40 may be programmed, stored in, or otherwise accessible by the host machine 26 of FIG. 1, and is usable by the method 100, to accurately predict, classify, or otherwise recognize a pattern in the collected sensory data 11 and generate an output signal (arrow 90) during formation of the weld spots/welded joint. The neural network 40 may include at least one input layer 50 having a plurality of different input neurons or nodes 51, each of which is configured to receive data, measurements, and/or other predetermined information from outside of the neural network 40. This information or input set 45 may include, but is not limited to, a detected temperature 61 at the interface 17, a dynamic resistance 63 measured between the sonotrode 18 and the anvil 24 of FIG. 1, and a displacement 65 of the work piece 22. At least one additional input node 51 may be configured to receive an additional piece or pieces of input data, a measurement, or other process information as needed, as represented by the variable 67. For example, the input variable 67 may correspond to measurements from one of the sensors 125 set forth above, e.g., infrared camera measurements, acoustic measurements, and the like.

Still referring to FIG. 4, the neural network 40 further includes at least one "hidden" layer 52 containing a plurality of hidden neurons or hidden nodes 53 that each receive and pass along information that is output from the input nodes 51 of the input layer 50 in a particular manner, with the hidden nodes passing along the processed information to other neurons or nodes of one or more additional hidden layers (not shown) if used, or directly to an output layer 54. The output layer 54 likewise contains at least one output neuron or output node 55 that communicates or transmits information outside of the neural network 40, such as to the indicator device 19 (see FIG. 1) and/or to a training database as determined by method 100, which is described below with reference to FIG. 5. Nodes 53 and 55 may contain linear, sigmoidal, or other transfer functions that process the input set 45, e.g., by assigning particular importance or weight to the different values in the input set, as will be understood by those of ordinary skill in the art.

After correlation, that is, after the host machine 26 predicts or determines a weld quality using the extracted feature set or the total weld signature as noted above, the host machine may then execute a control action(s) in response to the result. This may include activating indictor device 19 of FIG. 1, such as an audio and/or visual display panel, beacon, human-machine interface panel, etc., temporarily shutting down the welding process, transmitting a message, etc. Other suitable control actions might include executing open loop or closed loop control in real time over the welding process to quickly change certain internal control variables, e.g., the power control signal (arrow 23) and/or the oscillation signal (arrow 57), or other internal signals. Use of servo controls, such as the servo device 20 of FIG. 1, may optimize response times when such process control is desired. The library 30 may be pre-populated with known passing and failing patterns of the total weld signature and/or validated feature sets thereof, with the host machine 26 automatically referencing the library during correlation.

Figure 5:
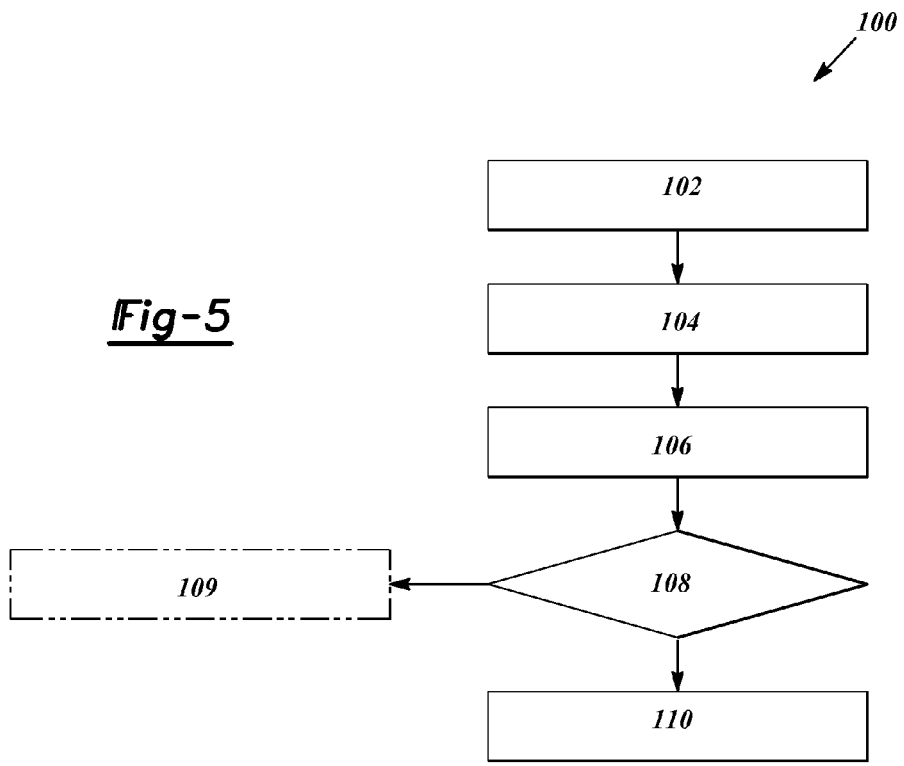
FIG. 5 is a flow chart describing a method for monitoring and controlling the quality of a welded joint formed using the system of FIG. 1.

Referring to FIG. 5, and with reference to the structure of FIG. 1, the present method 100 begins with step 102, wherein the vibration welding process is initiated. Step 102 includes any required positioning and preparatory steps, such as placing the work piece 22 on the anvil 24, and initiating the vibration welding process with the welding system 10. The method 100 then proceeds to step 104.

At step 104, the sensors 25, 125 collect the sensory data 11, 111, respectively, and transmit or relay the sensory data to the host machine 26. Once received by host machine 26, the method 100 proceeds to step 106, wherein the host machine correlates the sensory data 11, 111 with the contents of the library 30 using any of the approaches noted above.

Figure 6:
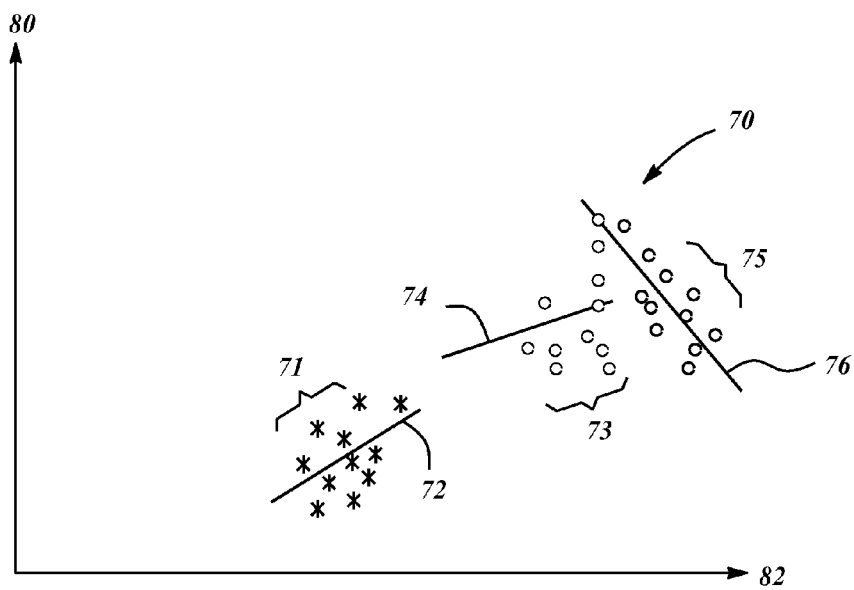
FIG. 6 is a plot of weld quality versus a measured weld attribute.

Referring briefly to FIG. 6, a plot 70 is provided for three different weld spots, with weld quality (vertical axis 80) plotted versus the particular weld attribute being measured, e.g., temperature or displacement, i.e., the horizontal axis 82. Data points 71, 73, and 75 each represent a measurement of an attribute and its quality, e.g., tensile strength, for a given welded joint. Regression analysis, e.g., least squares, might determine a correlation coefficient R as understood in the art, and find the $R^2$ value, and a line of best fit, i.e., lines 72, 74, and 76.

Plot 70 represents that the relationship between a given weld quality and weld attribute is not necessarily linear, or that the relationship may be linear for a portion of the spectrum, becoming non-linear in other portions. For example, if the attribute is a welding temperature and the quality is a tensile strength, an increase in temperature, to a point, may result in an increase in strength. Further increases in temperature may have little effect, or may degrade the weld strength. Therefore, a need may persist for hard lower and upper threshold limits for certain weld attributes, with such limits stored as calibrated values and referenced during execution of the present method 100. Whichever correlation technique is used, once step 106 is complete the method 100 proceeds to step 108.

At step 108, the host machine 26 makes a determination as to the quality of the weld spot(s)/joints presently being formed. If the host machine 26 determines that the welding signature or a present feature set extracted therefrom that is defined by the sensory data 11, 111 corresponds to an unacceptable weld, the method 100 proceeds to step 110, otherwise the method is finished, or optionally the method may proceed to step 109.

At step 109, a predicted good or passing weld from step 108 may be added to the library 30. Such a step may help to optimize the predictive accuracy of the method 100, e.g., by providing the neural network 40 of FIG. 4 or any of the other possible correlating techniques with another weld signature against which to compare. Alternately, the weld signature defined by sensory data 11, 111 may be identified for future validation, and added to the library 30 only after being independently validated against calibrated quality metrics.

At step 110, the host machine 26 may automatically execute one or more control actions as noted above, e.g., activating indictor device 19, temporarily shutting down the welding process, transmitting a message, executing open loop or closed loop control over the welding process, etc. The method 100 is then finished.

While the best modes for carrying out the invention have been described in detail, those familiar with the art to which this invention relates will recognize various alternative designs and embodiments for practicing the invention within the scope of the appended claims.

The invention claimed is:

1. A method for monitoring and controlling a vibration welding system having a sonotrode and an anvil during a vibration welding process, the welding system being configured for forming a welded joint at welding interfaces of a work piece that is clamped between the sonotrode and the anvil, wherein forming the welded joint is accomplished using a high-frequency mechanical vibration, the method comprising:
    embedding at least one thermocouple inside of the anvil;
    collecting a set of sensory data during formation of the welded joint using a plurality of sensors positioned with respect to the welding interfaces, wherein the embedded at least one thermocouple is one of the plurality of sensors, including directly measuring a temperature at the welding interfaces using the embedded at least one thermocouple and measuring a dynamic resistance between the anvil and the sonotrode, an acoustic signal, and a displacement of a portion of the welding system;
    forming a total weld signature using the sensory data, wherein the total weld signature is defined by a plurality of different welding parameters from the set of sensory data;
    extracting a present feature set from the total weld signature as a combined grouping of a plurality of the welding parameters using a host machine;
    comparing and correlating the present feature set, via the host machine in real time during the formation of the welded joint, with validated information contained in a library to recognize a pattern in the combined grouping of the present feature set; and
    executing a control action when the pattern in the extracted present feature set insufficiently matches the information in the library.

2. The method of claim 1, wherein executing at least one control action includes at least one of: changing a control parameter of the vibration welding system, activating an indicator device, and temporarily stopping the vibration welding process.

3. The method of claim 1, wherein the anvil includes a wall defining at least one bore and wherein the thermocouple is positioned within the bore.

4. The method of claim 1, wherein extracting a present feature set from the weld signature using a host machine includes using at least one of: a neural network, finite element analysis, statistical regression analysis, and principal component analysis.

5. The method of claim 1, wherein collecting a set of sensory data during the formation of the welded joint includes collecting the set of sensory data while vibration welding a conductive electrode tab of a multi-cell battery to a conductive interconnecting member of the multi-cell battery.

6. The method of claim 1, wherein the anvil is segmented, and wherein embedding at least one thermocouple inside of the anvil includes positioning the thermocouple between adjacent segments of the anvil.

7. A welding system configured for forming a welded joint at welding interfaces of a work piece using a high-frequency mechanical vibration during a vibration welding process, the welding system comprising:
    a plurality of sensors positioned with respect to the welding interfaces, including a thermocouple that is embedded inside of the anvil, wherein the sensors are operable for collecting a set of sensory data;
    a sonotrode configured to vibrate during the vibration welding process, wherein the set of sensory data includes a temperature measured directly at the welding interfaces using the embedded thermocouple, a dynamic resistance between the anvil and the sonotrode, an acoustic signal, and a displacement of a portion of the welding system; and
    a host machine having access to a library of validated information;
    wherein the host machine is configured to:
        extract a present feature set from a total weld signature formed using the sensory data, wherein the present feature set is a combined grouping of a plurality of welding parameters from the sensory data;
        compare and correlate the extracted present feature set in real time with validated information contained in the library to recognize a pattern in the combined grouping of the present feature set; and
        execute a control action when the pattern in the extracted present feature set insufficiently matches the information in the library.

8. The welding system of claim 7, wherein the host machine is adapted for executing the at least one control action by at least one of: changing a control parameter of the welding system, activating an indicator device, and temporarily stopping the vibration welding process.

9. The welding system of claim 7, wherein the welding system includes an anvil having a wall which defines a bore immediately adjacent to the welding interfaces, and wherein the thermocouple is positioned within the bore.

10. The welding system of claim 7, wherein the host machine is configured to extract the feature set using principal component analysis.

11. The welding system of claim 7, further comprising a welding anvil having a plurality of segments, wherein at least one of the sensors is positioned between adjacent segments of the plurality of segments.

* * * * *